(12) United States Patent
Hatanaka et al.

(10) Patent No.: US 6,394,113 B1
(45) Date of Patent: May 28, 2002

(54) METHOD AND APPARATUS FOR CLEANING FILTERS

(75) Inventors: Shingo Hatanaka; Shoji Ebina, both of Hyogo (JP)

(73) Assignee: Kawasaki Jukogyo Kabushiki Kaisha (JP)

(*) Notice: Subject to any disclaimer, the term of this patent is extended or adjusted under 35 U.S.C. 154(b) by 79 days.

(21) Appl. No.: 09/607,741

(22) Filed: Jun. 30, 2000

(30) Foreign Application Priority Data

Jul. 9, 1999 (JP) .......................................... 11-195840

(51) Int. Cl.[7] .............................................. B01D 41/04
(52) U.S. Cl. ...................... 134/184; 134/56 R; 134/61; 134/76; 134/82; 134/137; 134/140; 134/165; 210/106
(58) Field of Search ................................. 210/106, 108, 210/111; 134/1, 26, 56 R, 57 R, 58 R, 61, 135, 137, 140, 165, 184, 201

(56) References Cited

U.S. PATENT DOCUMENTS

| | | | |
|---|---|---|---|
| 3,442,273 A | 5/1969 | Hanish et al. | 134/100 |
| 3,613,700 A * | 10/1971 | Werth et al. | 134/105 |
| 3,932,278 A * | 1/1976 | Meidl et al. | 134/25.5 |
| 5,361,790 A * | 11/1994 | Park et al. | 134/105 |
| 5,833,766 A | 11/1998 | Osterwald et al. | 134/22.12 |

FOREIGN PATENT DOCUMENTS

| | | | | |
|---|---|---|---|---|
| DE | 38 43 798 A | | 7/1990 | |
| JP | 04-180889 | * | 6/1992 | 210/167 |
| JP | 09-014616 | * | 1/1996 | |
| JP | 9-276633 | | 10/1997 | |

* cited by examiner

Primary Examiner—Frankie L. Stinson
Assistant Examiner—Joseph Perrin
(74) Attorney, Agent, or Firm—Marshall, Gerstein & Borun (57) ABSTRACT

In a method and apparatus for cleaning filters, the cleaning is efficiently performed by selecting cleaning steps according to the degree of contamination of the filter media. The degree of contamination of the filter media is analyzed before the filter is carried into the cleaning apparatus. Filters with heavily contaminated filter media are subjected to pretreatment before the cleaning process is performed, and the filters with less contaminated filter media are directly subjected to the cleaning process. The cleaned filter is subjected to a restoration process before reuse.

7 Claims, 10 Drawing Sheets

METHOD AND APPARATUS FOR CLEANING FILTERS

BACKGROUND OF THE INVENTION

1. Field of the Invention

The present invention relates to a method and apparatus for cleaning filters, such as air intake filters, ventilation air filters contaminated with dust and other particles, etc.

2. Description of the Related Art

Filters are used in various fields to remove dust and other particles from fluid such as air. For example, medium performance filters are used for air passages in air conditioning systems in buildings or underground shopping malls, and are used in air intake lines of devices such as local gas turbine generators. These filters are used to remove salts, dust, oil particles, fibers and other substances (hereafter collectively referred to as "contaminants") from the air by collecting them on a filter media of resin fiber or other materials.

Figure 10A:
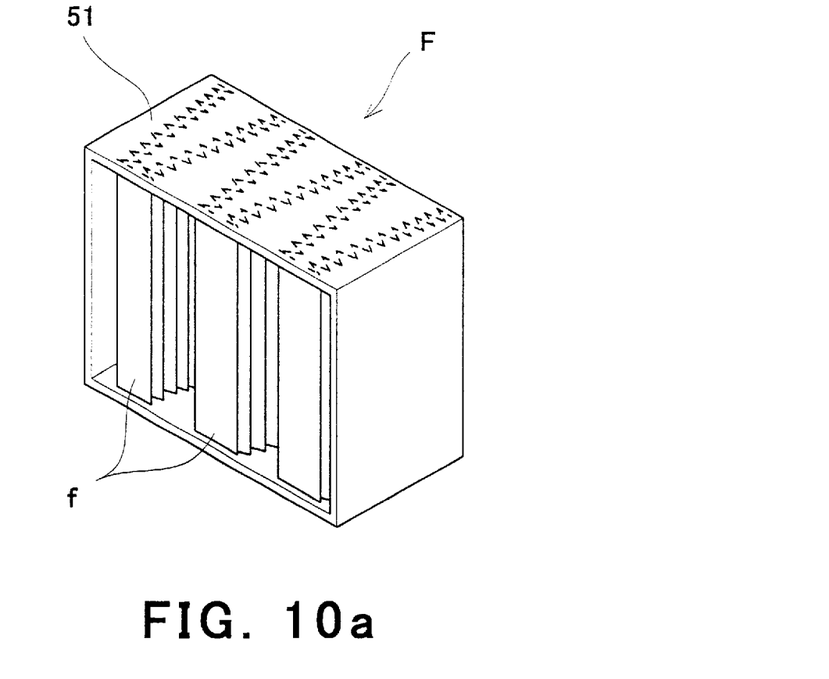
FIGS. 10a and 10b are perspective views of filters to be cleaned by the cleaning apparatus according to the present invention.
Figure 10B:
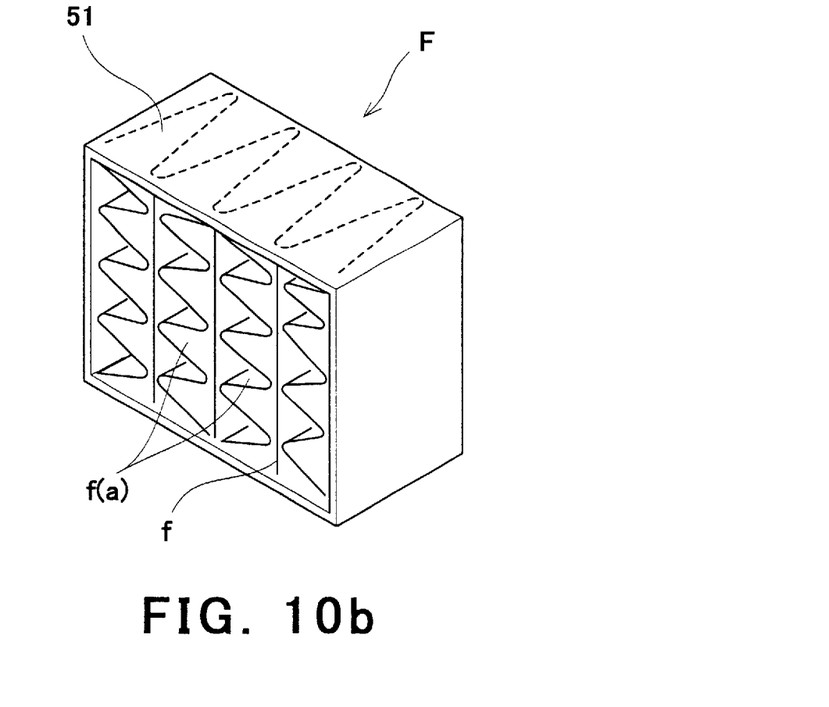

FIGS. 10a and 10b show a perspective view of such filters. The filter F shown in FIG. 10a has a filter media f with a corrugated non woven fabric of resin fibers or of glass fibers, folded in parallel to the corrugation in zigzag pattern and retained within a frame 51. The filter F shown in FIG. 10b has a filter. media f folded in zigzag pattern with corrugated separators f(a) inserted between folded filter media and retained-within the frame 51.

As an apparatus for cleaning such filters, the applicant has filed a patent application of an ultrasonic cleaning apparatus (Japanese Laid-Open Patent Publication No. Hei 9-276633). In this apparatus, a contaminated filter accommodated on a rack is conveyed by a handling unit to an ultrasonic cleaning tank for cleaning, and a cleaned filter is rinsed in a rinse tank and returned to the rack.

However, filters F cannot always be cleaned under the same condition because the degree of contamination of such filters varies according to their conditions of usage and other factors. For instance, when all filters are cleaned in the condition needed for cleaning heavily contaminated filters, a considerable time loss occurs in the cleaning of less contaminated filters.

On the other hand, when all filters are cleaned in the short period of time needed for cleaning of less contaminated filters, sufficient cleaning effect is not obtained for the heavily contaminated filters, and cleaning of the internal portion of the filter media is sometimes difficult.

Moreover, as filters F has a frame surrounding a complicated filter media, contaminants removed from the filter media tend to reattach on the cleaned filter media, which sometimes makes difficult the complete removal of contaminants.

It is therefore an object of the present invention to provide a method and apparatus for cleaning filters in accordance with the degree of contamination.

SUMMARY OF THE INVENTION

In the filter cleaning method according to the present invention, the degree of contamination of the filter media is analyzed to select the cleaning steps of the filter according to the degree of contamination. Heavily contaminated filters are subjected to pretreatment before cleaning, while less contaminated filters are cleaned without pretreatment, and cleaned filters are subjected to a restoration process for preventing decrease in thickness of the filter media after-drying. The pretreatment can be performed by a method such as immersing the filter in a pretreatment solution containing a detergent. The restoration can be performed by a method such as immersing the filter media in a restoration solution containing a softener. In this way, the necessity of performing pretreatment is determined according to the degree of contamination, therefore, the heavily contaminated filter media is cleaned effectively by the addition of pretreatment before the cleaning, while the less contaminated filter media is cleaned in a shorter time. Moreover, by utilizing the restoration process after the cleaning, the capturing capacity of contaminants per filtering area is restored to the capacity before the cleaning.

Heavily contaminated filters are preferably subjected to pretreatment and to rinsing of the pretreatment liquid before the cleaning. The contaminants become easily removable by the pretreatment, and a greater part of the contaminants can be removed by the rinsing to significantly enhance the effectiveness of the subsequent cleaning process.

In addition, the sterilization of filters for use in environments which will affect human beings can be performed continuously after the restoration.

Furthermore, by performing processes up to the cleaning and processes after the cleaning in separate systems, the processes up to the cleaning which need longer time, and processes after the cleaning can be performed independently, thus increasing the efficiency and reducing the time needed for performing the cleaning operation.

Ultrasonic cleaning can efficiently remove contaminants within the filter media.

The cleaning unit according to the present invention comprises, means for analyzing the degree of contamination of the filter media, means for arranging the filter in a predetermined location according to the degree of contamination, means for conveying the filter from the predetermined location, means for performing pretreatment when the filter is classified as heavily contaminated, means for cleaning the filter; and means for restoring the filter media for preventing reduction of thickness after the cleaning. With this filter cleaning method and apparatus, the degree of contamination of the filter media is first analyzed by the analysis means and classified according to previously determined standards, and the filter is accommodated at the predetermined location according to the classification. The heavily contaminated filter is conveyed to the pretreatment process, and the less contaminated filter is conveyed directly to the cleaning process by the conveying means. Then the filter media of the cleaned filter is restored. Thus efficient cleaning operation can be performed by selecting the cleaning procedure according to the degree of contamination of the filter media. As a result, by the restoration after the cleaning, sufficient filtering capacity of the cleaned filter can be restored.

In addition, by providing the pretreatment rinsing means, the cleaning effect can be increased because the contaminants have become easily removable by the pretreatment process and can be rinsed away before the cleaning. The pretreatment rinsing means provided by a pretreatment rinse tank having a flow generating means for directing rinsing liquid toward the filter media also enhances the filter cleaning effect.

Filters for use in environments that affect human beings can be sterilized after the cleaning by the sterilization means which is provided after the restoration of the filter media.

Furthermore, by separating conveying means into two separate systems, i.e. conveying means for conveying the filter in processes up to the cleaning of the filter, and conveying means for conveying the filter in processes after the cleaning, cleaning of the filters which need a longer time can be performed simultaneously with other processes such as a restoration process. As a result, working efficiency is significantly increased thereby reducing the total work time.

In addition, by forming the cleaning means as an ultrasonic cleaning tank, in which the filter is immersed for a specified amount of time, the contaminants adhered on the filter media can be removed effectively by means of cavitation created by the ultrasonic waves.

Moreover, by conveying means which comprises a filter frame for holding the filter and a conveyor unit which holds the upper portion of the filter frame while conveyed, the conveyor unit can be prevented from being wetted by the cleaning liquid during the pretreatment, cleaning or restoration processes.

These objects as well as other objects, features and advantages of the present invention will become more apparent to those skilled in the art from the following description with reference to the accompanying drawings.

DESCRIPTION OF THE PREFERRED EMBODIMENTS

Figure 1:
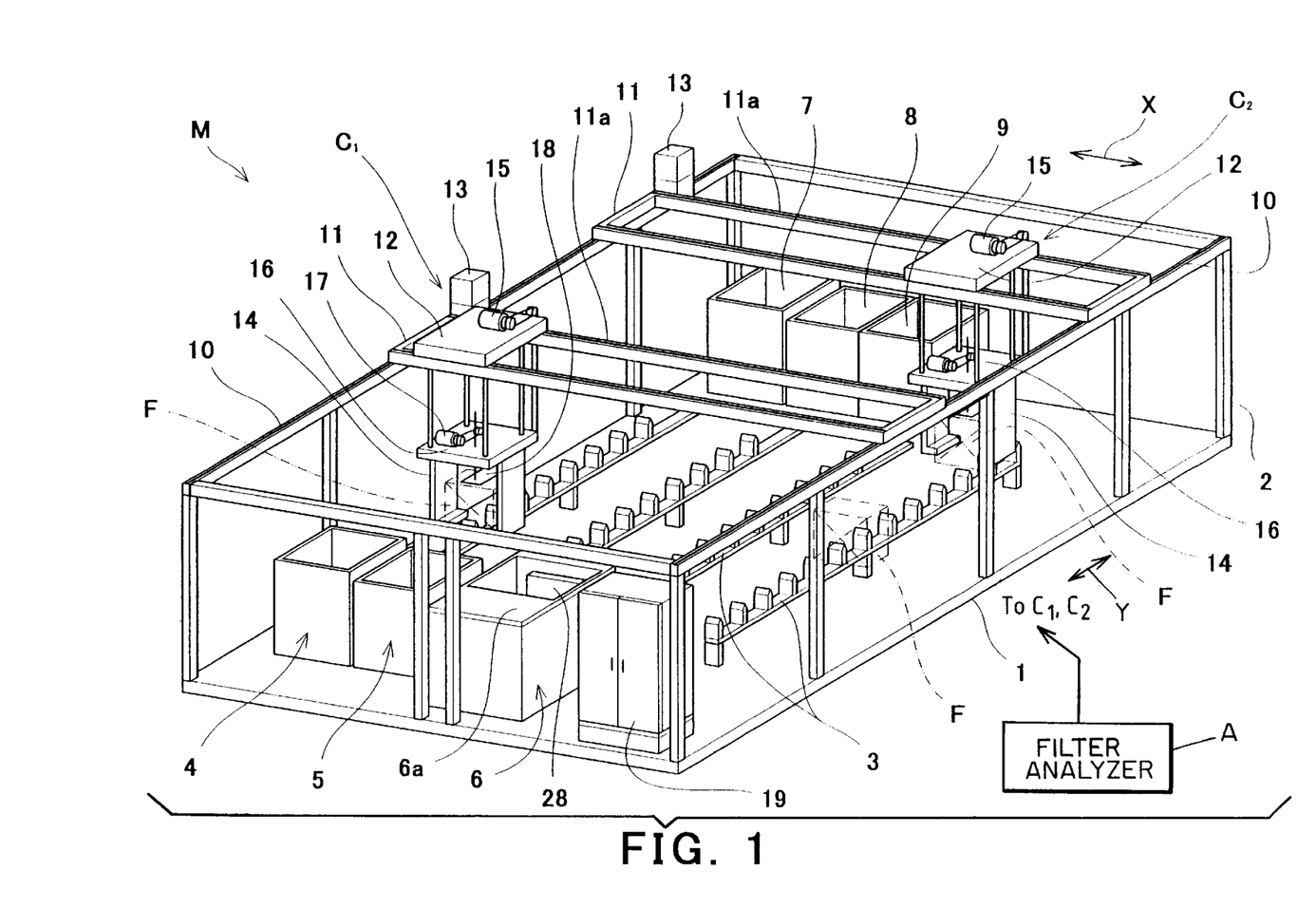
FIG. 1 is a perspective view of a preferred embodiment of a filter cleaning apparatus according to the present invention.

As shown in FIG. 1, a support frame 2 of conveyor unit C1 and C2 of a filter cleaning apparatus M is provided on a foundation 1 of rectangular plane shape. Conveyor units C1 and C2 movable in the direction X and Y are mounted on the top surface of the support frame 2. Racks 3 are provided on the foundation 1 for temporarily accommodating a plurality of filters to be cleaned and cleaned filters. The racks 3 are arranged in a plurality of lows in the width direction (X direction) to accommodate a plurality of filters F in longitudinal direction (Y direction), and each accommodating location is previously numbered.

Transportation of filters to the rack 3 is performed by a transporting unit (not shown) such as a crane or a conveyor belt. The transporting unit is provided with filter analyzer means A for analyzing the degree of contamination of the filter media to be cleaned. The degree of contamination of the filter media can be analyzed by such as measuring a pressure drop by passing a gas through the filter media, or by measuring the weight difference of the filter between a contaminated condition and a non-contaminated condition. The degree of contamination can also be analyzed by measuring the thickness of the filter media, because the thickness of the filter media increases according to the amount of accumulated contaminants. Various other means can be employed for analyzing the degree of contamination. The filter to be cleaned is preliminary classified according to the degree of contamination by the analyzing means.

On both lengthwise end portions of the foundation 1, a plurality of tanks are arranged for performing the respective steps of cleaning filters F. In this embodiment, a pretreatment tank 4, a pretreatment rinse tank 5 and a tank 6a for ultrasonic cleaning unit 6 are arranged in the front end portion (lower left portion of FIG. 1) of the foundation 1. A rinse tank 7, a restoration tank 8 and a sterilization tank 9 are provided in the rear end portion (upper right portion of FIG. 1) of the foundation 1. In this embodiment, processes up to the cleaning, i.e. processes performed in the group of tanks 4, 5, and 6a, and processes after the cleaning, i.e. processes performed in the group of tanks 7, 8, and 9, can be performed in separate systems, and two conveyor units C1 and C2 are provided for conveying filter F in each respective system.

Conveyor units C1 and C2 are mounted respectively on a rectangular conveyor-frame 11 which is movable along rails 10 mounted on the top surface of the support frame 2 in the Y direction. A conveyor cart 12 is mounted on the respective conveyor frame 11 and movable along rails 11a in the X direction. The conveyor frames 11 are moved in the Y direction along the rails 10 by drive units not shown, and the conveyor carts 12 are moved along the conveyor frames 11 in the X direction by drive units 13. Holding means are provided on the underside of respective conveyor carts 12 for holding the filter F during transport and process. The holding means in this embodiment is formed as a pair of conveyor arms 14 to hold the filter F frame in widthwise.

The conveyor arms 14 are provided on the underside of the platform 16 which is suspended under the conveyor cart 12 and is moved vertically by a drive motor 15, and adapted to move oppositely in widthwise with each other by a drive motor 17. A holding plate 18 is provided between the conveyor arms 14 to hold filters F at a specified position in the liquid in the respective tank. A control panel 19 is provided for controlling these units.

The pretreatment tank 4 is provided to facilitate removal of contaminants adhered to the filter media f. In this embodiment, the pretreatment tank 4 is a square vessel filled with an aqueous solution containing detergent as a pretreating agent. By immersing the filters F in the aqueous solution, the detergent penetrates into the boundaries between contaminants and fibers of the filter media f to facilitate removal of contaminants and thereby enhance the cleaning effect in the. subsequent cleaning process by the cleaning unit 6.

Figure 2:
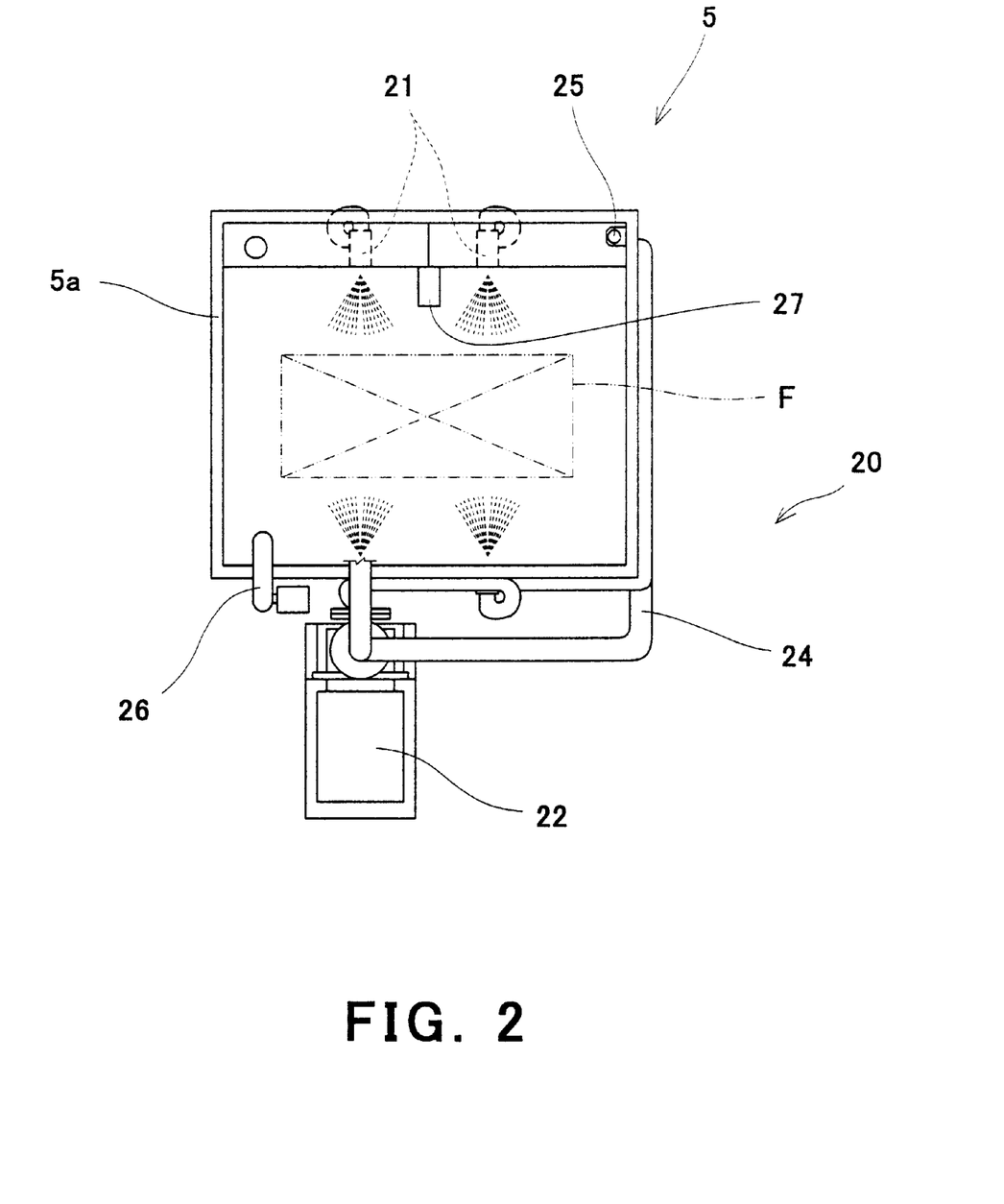
FIG. 2 is a plan view of an example of a pretreatment rinse tank shown in FIG. 1.
Figure 3:
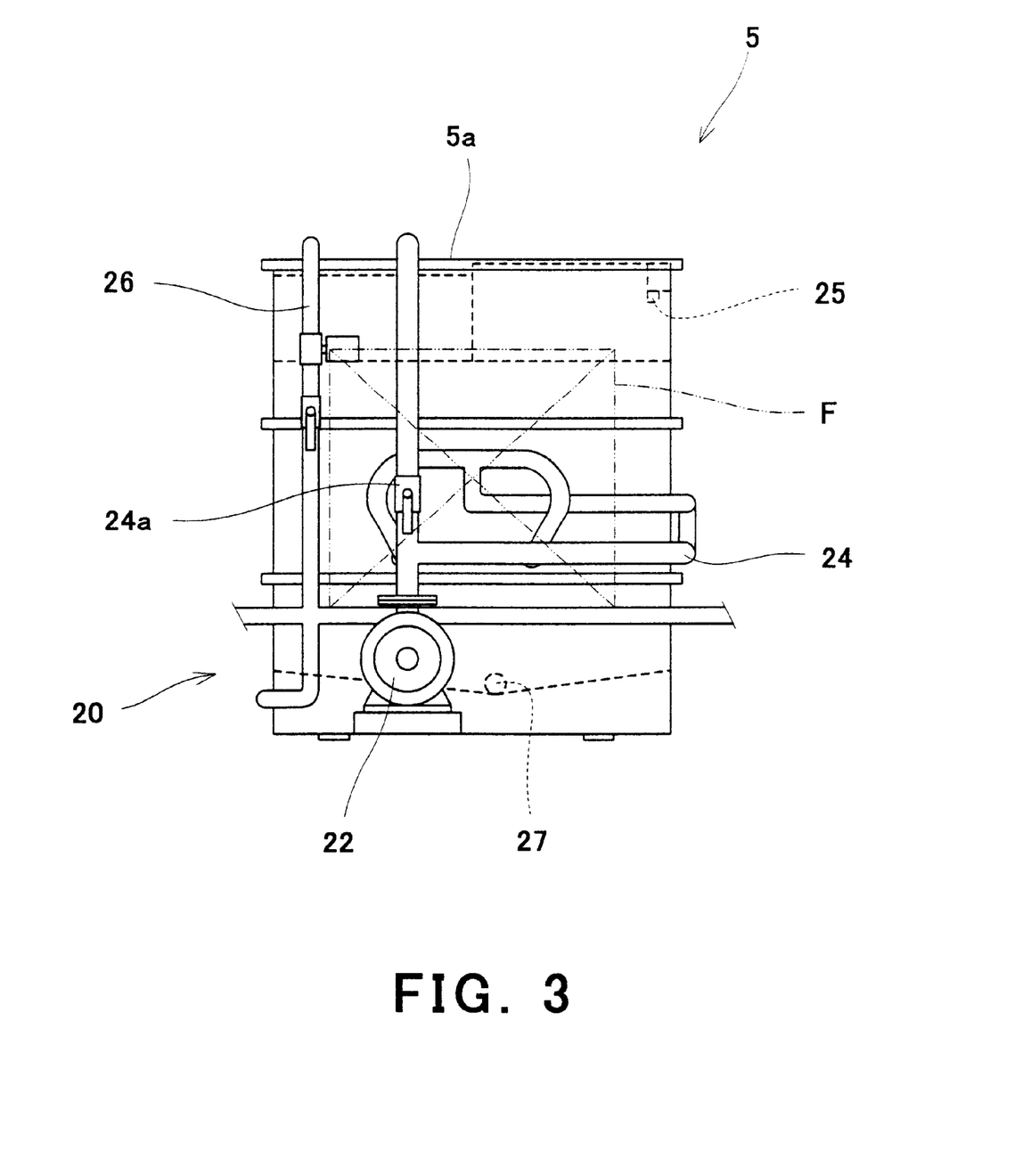
FIG. 3 is a front view of the pretreatment rinse tank in FIG. 2.
Figure 4:
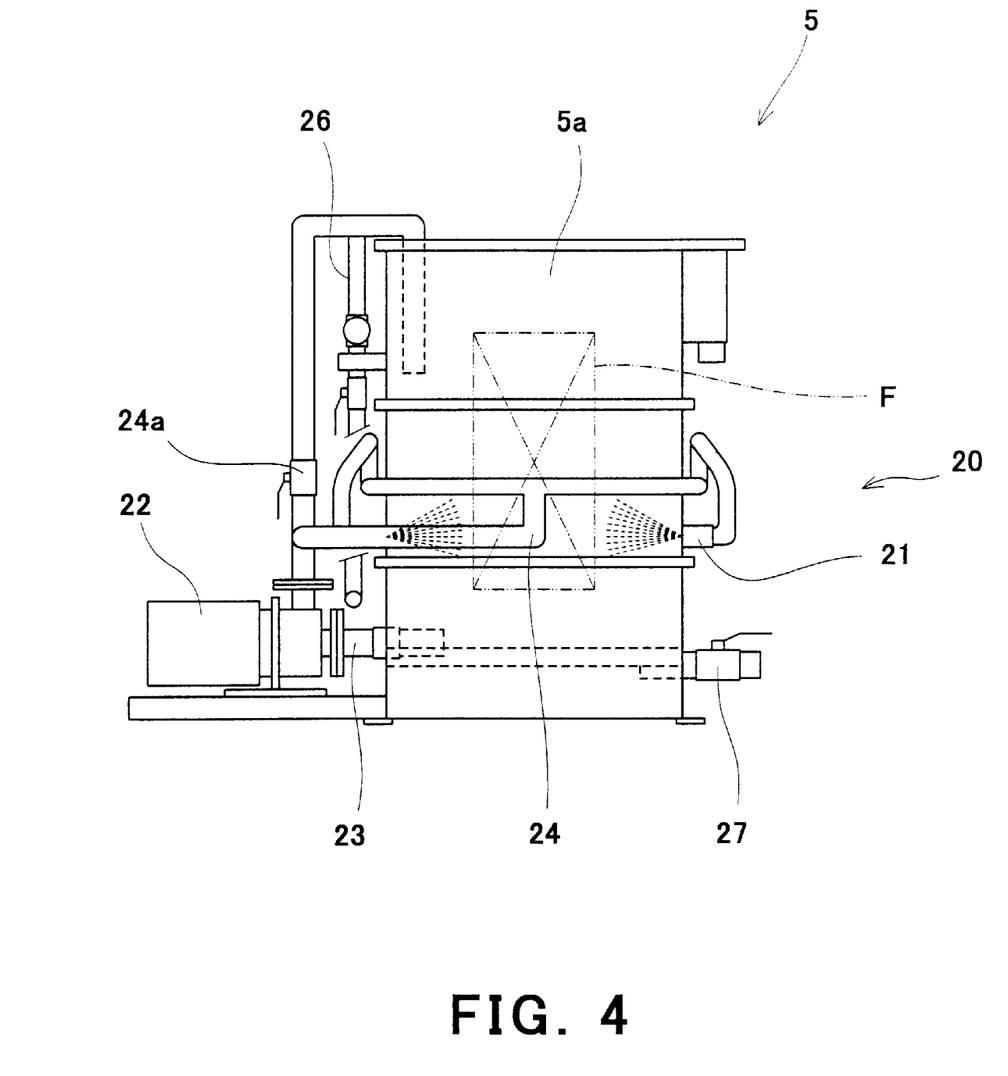
FIG. 4 is a side view of the pretreatment rinse tank in FIG. 2.

The pretreatment rinse tank 5 is provided for rinsing away the contaminants being made easily removable by the penetration of the detergent in the pretreatment tank 4. FIG. 2 shows an example of a plan view of the pretreatment rinse tank 5. FIGS. 3 and 4 show a front view and a side view of the pretreatment rinse tank 5. In this embodiment, a flow generator 20 is provided as a flow generating means to facilitate removal of contaminants.

The filter F is immersed in the water in a square vessel 5a in the pretreatment rinse tank 5, and the flow generator 20 creates a water flow directed toward both sides of the filter media f. Water flow is created on the surface of the filter media f by the water ejected from nozzles 21 provided at lower portion of both sides of the filter media f. In this embodiment, two nozzles 21 are provided on each side to cause water flow to each respective face of the filter media f. The water suctioned by a pump 22 through an intake pipe 23 provided at the bottom of the pretreatment rinse tank 5 is delivered through a pipe 24 to each of the nozzles 21. In the figures, the water is shown as ejected from all of the nozzles 21, but in the actual operation, the water is ejected alternately, so that when the water is ejected form the nozzles 21 on one side, the ejection from the nozzles 21 on the other side is stopped. This is for the purpose of allowing a part of water to pass through the filter media f for preventing recontamination of the other filter media side. With such rinsing, a part of water flow created by the nozzles 21 can flow through the filter media f and promote removal of contaminants within the filter media f. The type of flow generator can be selected according to the size of the filter F and the thickness and shape of the filter media f. A selector valve 24a is provided on the pipe 24 to select the water flow to eject from the nozzles 21 or to circulate to the upper portion of the pretreatment rinse tank 5.

A water level sensor 25 is also provided to detect the drop of the water level in the pretreatment rinse tank 5. When the drop of water level is detected, the water is supplied through a supply pipe 26. In this embodiment, the water is also delivered to the other tanks 4, 6a through the supply pipe 26. A drain pipe 27 is also provided.

The cleaning unit 6 is a unit that utilizes ultrasonic waves for removing the contaminants stuck to the filter media f by a cavitation created by the ultrasonic waves in the cleaning liquid. The filter F is inserted from the open top of the square ultrasonic cleaning tank 6a of the cleaning unit 6 and held upright in the cleaning liquid to direct both the upstream side and the downstream side of the filter media f in a horizontal direction, so that the filter media f is cleaned by the ultrasonic waves generated by the ultrasonic oscillator 28 provided on the upstream side or the downstream side of the filter F. The ultrasonic wave generated by the ultrasonic oscillator 28 creates effective cavitation in the filter media f of the filter F held in the cleaning liquid. In this embodiment, the filter F and the ultrasonic oscillator 28 do not move with respect to each other during the cleaning. Depending on the type or other factors of the filter F, however, it is possible to move either of them during cleaning. In this embodiment, the filter F is held stationary at the predetermined location in the cleaning tank 6a by the conveying arm 14 of the conveyor unit C1.

The filter media f is held in parallel to the ultrasonic oscillator 28 to face each other in the ultrasonic cleaning tank 6a. Therefore, a filter media f with large surface area can be cleaned effectively utilizing cavitation created by the ultrasonic waves passed through the filter media f and reflected on the opposite wall.

The rinse tank 7 is adapted to wash away the reattached contaminants once removed from the surface of the filter media f by the ultrasonic cleaning unit 6. Similar to the pretreatment rinse tank 5, the rinse tank 7 also has flow generators 20 to remove contaminants once removed by the cleaning unit 6 and contaminants dropped from the filter media f and reattached on the filter F. By holding the filter F stationary in this manner during removal of the contaminants, the reattachment of contaminants can be prevented.

The restoration tank 8 is adapted to restore filtering capacity by preventing reduction of thickness of the filter media f due to the shrinkage after cleaning. The restoration tank 8 also has a square shape and is filled with restoration liquid. Examples of the restoration agent used in the restoration tank 8 for restoring the filter media f include nonionic surface activators, positive ion surface activators and other softeners. The kind of restoration liquid can be selected according to the type and thickness of the filter media f.

The sterilization tank 9 is used for sterilizing the filter F after the restoration, and particularly for sterilizing filters of indoor or household use to prevent pollution with germs in environments that may affect human beings. The sterilization tank 9 also has a square shape. Ozonized water and hypochlorous acid soda may be used as the sterilization medium.

Figure 5:
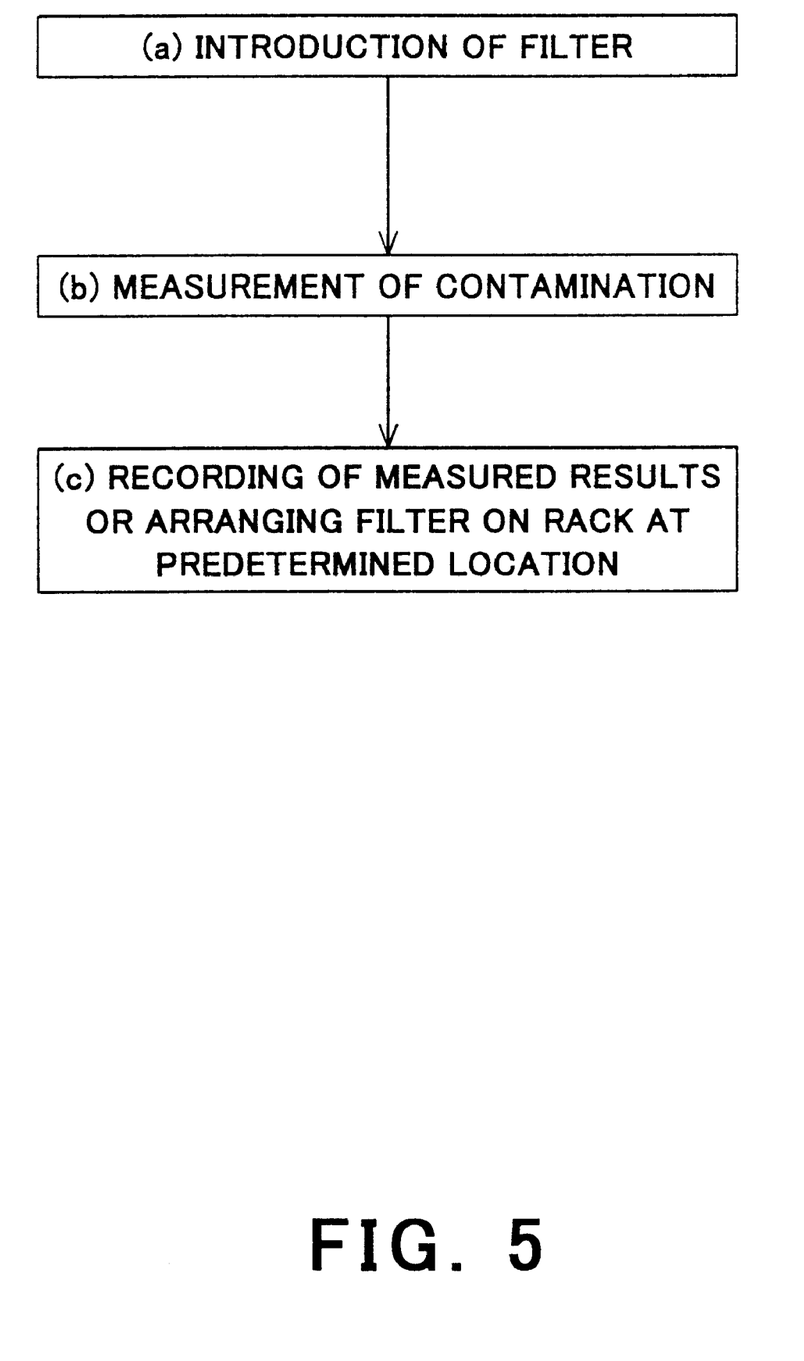
FIG. 5 is a flow chart showing an example of analyzing the degree of contamination of filters to be conveyed into the filter cleaning apparatus shown in FIG. 1.
Figure 6:
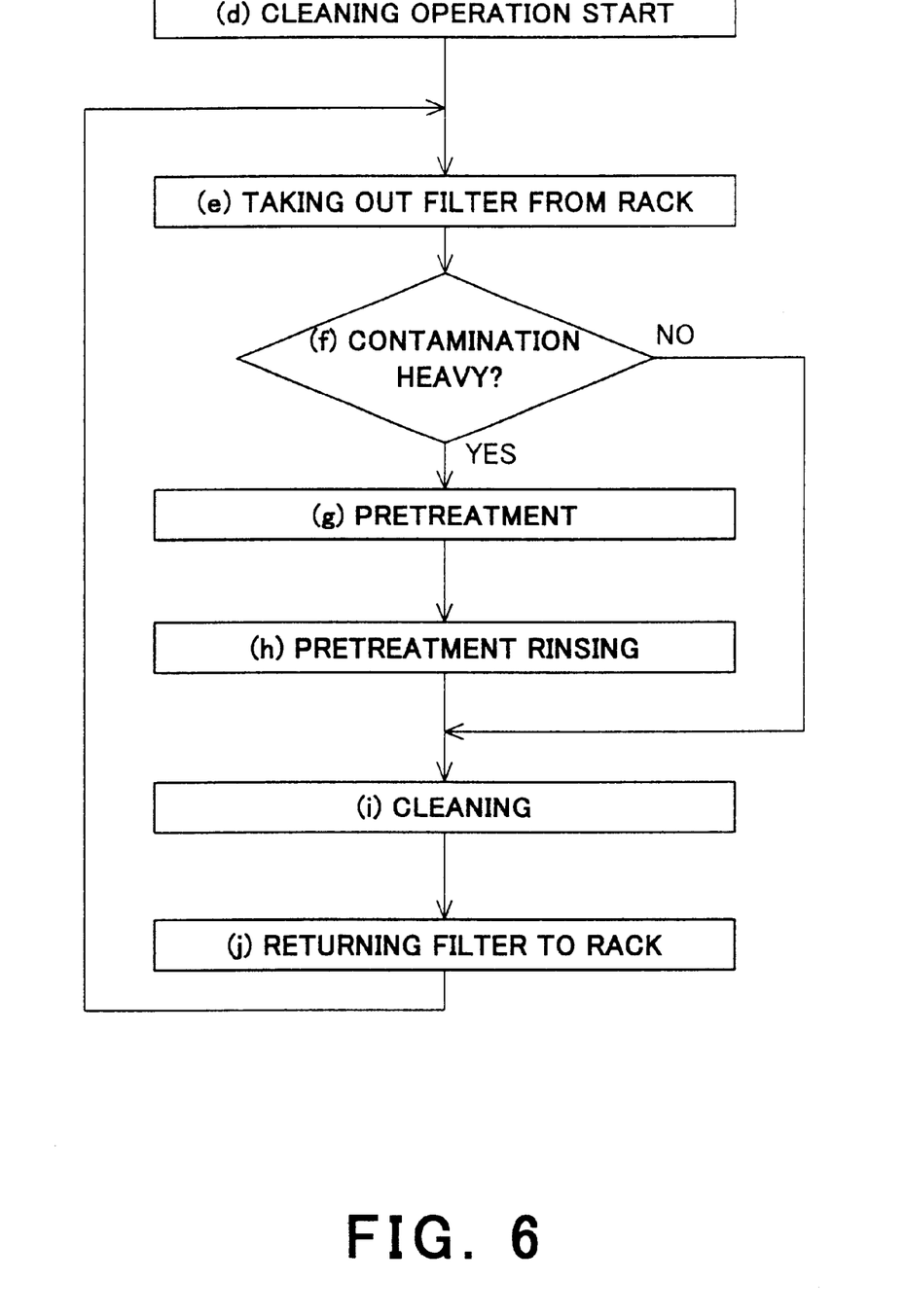
FIG. 6 is a flow chart showing processes up to a cleaning step in the filter cleaning apparatus shown in FIG. 1.
Figure 7:
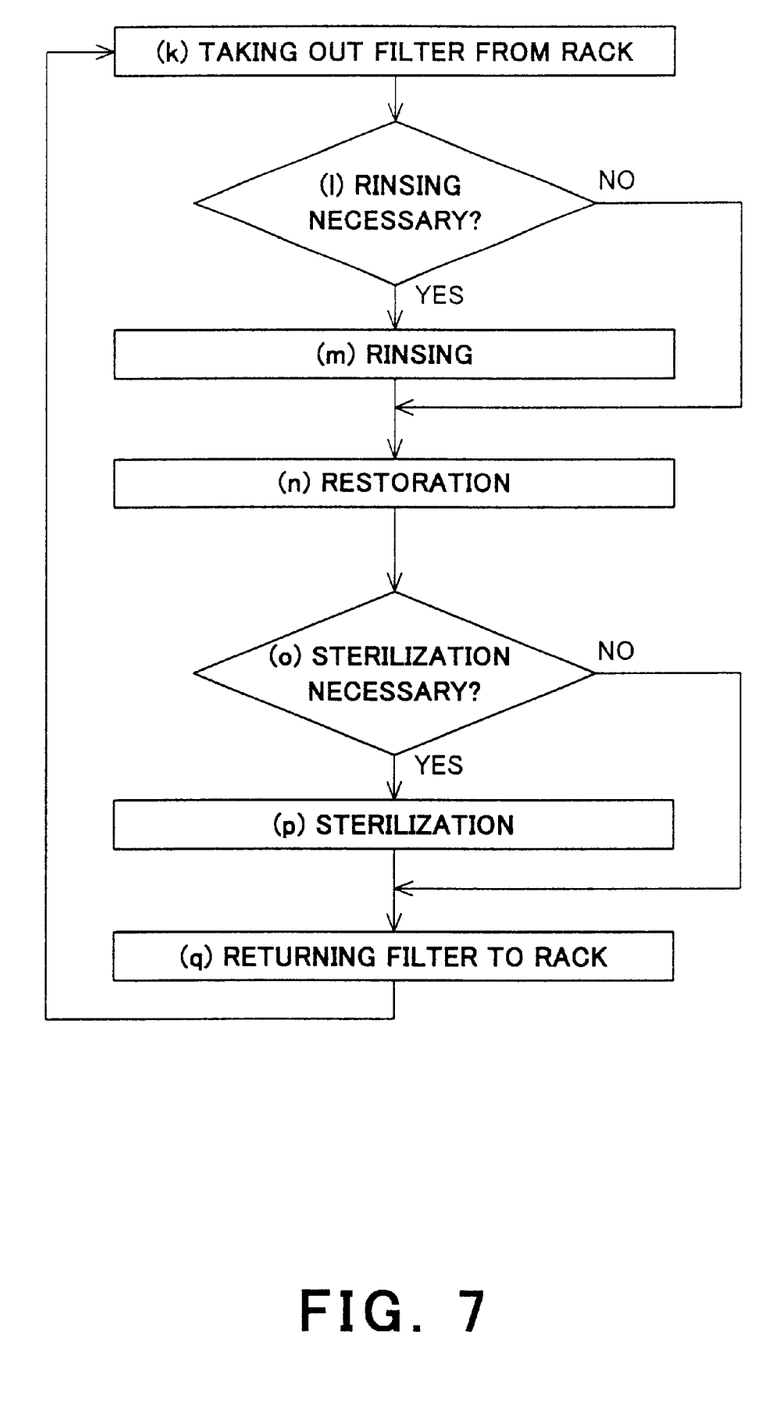
FIG. 7 is a flow chart showing processes after the cleaning step of the filter cleaning apparatus shown in FIG. 1.

FIG. 5 is a flow chart showing steps for analyzing the degree of contamination of the filter which is transported into the filter cleaning apparatus. FIG. 6 is a flow chart showing steps up to cleaning of the filter by the filter cleaning apparatus. FIG. 7 is a flow chart showing steps performed after the filter has been cleaned by the filter cleaning apparatus. The following explanation is based on the embodiment shown in FIG. 1 in which the respective processes up to the filter cleaning and processes after filter cleaning are performed as separate systems. In this embodiment, the filters F are classified in advance according to the degree of contamination, and arranged at predetermined locations on the rack 3 according to the classification. The filters F arranged on the same rack 3 are adapted to be sequentially cleaned under the same condition. Other selecting steps in the flow chart are determined by the data preliminary entered in the control unit.

As shown in FIG. 5, the filters F are transported into the filter cleaning apparatus M by transporting unit such as a conveyor belt (step a). The degree of contamination of the filters F is measured by the filter analyzer means A before the filters F are conveyed into the filter cleaning apparatus M (step b). The measured result is recorded in the control panel or the filters F are arranged at predetermined locations according to the measured result (step c). In this embodiment, the filters F are classified and arranged at the predetermined location on the rack 3 according to the degree of contamination determined by the filter analyzer means A. The conveyor units C1 and C2 are used as the means for conveying the filters F from the transporting unit to the rack 3. When the filters F to be cleaned have been placed at the predetermined location on the rack 3, the cleaning process can be started (step d) as shown in FIG. 6.

Heavily contaminated filter F is taken out from the rack 3 (step e) by the conveyor arm 14 of the conveyor unit C1, and if the filter F is classified as heavily contaminated (step f) conveyed to the pretreatment tank 4 according to the degree of contamination. In this embodiment, the filter F is already classified as heavily contaminated, the filter F is carried into the pretreatment tank 4 by the conveyor unit C1 in which the conveyor frame 11 moves in the Y direction along the rails 10, and the conveyor cart 12 moves in the X direction along the conveyor frame 11. Above the pretreatment tank 4, the filter F is dipped in the pretreatment liquid in the tank 4 by lowering conveyor arms 14. The filter F is held in the pretreatment liquid including detergent for a predetermined time period sufficient to allow the detergent to penetrate through the entire surface of the filter media (step g). After the predetermined time period, the filter F is removed from the pretreatment tank 4 by lifting conveyor arms 14, and conveyed into the adjacent pretreatment rinse tank 5.

Above the pretreatment rinse tank 5, the filter F is dipped in the water in the pretreatment rinse tank 5 by lowering conveyor arms 14, and the filter F is held in the predetermined position, then, the water is ejected from the nozzles 21 (FIG. 2) provided in the pretreatment rinse tank 5 to wash away the detergent on the filter media f and facilitate the removal of the pretreated contaminants (step h). After the predetermined time period, the filter F is removed from the pretreatment rinse tank 5 by lifting the conveyor arms 14, and conveyed into the adjacent cleaning unit 6.

Above the cleaning unit 6, the filter F is dipped into the cleaning liquid in the cleaning tank 6a by lowering conveyor arms 14. When the filter F is held at the predetermined position in the cleaning tank 6a, ultrasonic waves generated by the ultrasonic oscillator 28 detach the contaminants stuck on the filter media f (step i). The heavily contaminated filter F can be cleaned effectively, because the contaminants comes off easily after the pretreatment. After the predetermined time period, the filter F is removed from the cleaning unit 6 by lifting conveyor arms 14, and returned to the predetermined location on the rack 3 (step j). In this embodiment, filter conveying operation and filter holding operation in a series of processes up to the cleaning, i.e., step e to step j is performed by the conveyor unit C1 in a single system. By repeating operation of conveyor unit C1 in this system, a large number of filters F can be cleaned efficiently.

As shown in FIG. 7, the cleaned filter F returned on the rack 3 is taken out by conveyor arms 14 of the other conveyor unit C2 (step k). When rinsing is required (step 1), the filter F is conveyed into the rinse tank 7. Above the rinse tank 7, the filter F is dipped into water in the rinse tank 7 by lowering conveyor arm 14. As in step h, water is ejected from the nozzles 21 provided in the rinse tank 7 to rinse away the reattached contaminants on the filter media f (step m). After the predetermined time period, the filter F is removed from the rinse tank 7 by lifting conveyor arms 14, and then the rinsed filter F is conveyed into the adjacent restoration tank 8.

Above the restoration tank 8, the filter F is dipped into the restoration liquid in the restoration tank 8 by lowering the conveyor arms 14. Leaving the filter F in the restoration fluid for the predetermined time period, the filter media f is restored (step n). The restored filter F is removed from the restoration tank 8 by lifting conveyor arms 14, and if sterilization is required (step o), the filter F is then conveyed into the adjacent sterilization tank 9 and subjected to sterilization process (step p). Filters F for use in the environment where human beings work or livestock are kept, need sterilization in the sterilization tank 9. Filters F for use in industrial machinery or engines do not need sterilization.

The sterilized filter F is removed from the sterilization tank 9 by lifting conveyor arms 14, and the filter F is returned to the predetermined location on the rack 3 (step q) by the conveyor unit C2. The series of conveying and holding operations after the cleaning of filters F is performed by the other conveyor unit C2. The conveyor unit C2 repeats the process from the step k to the step g above, therefore, a large number of filters F can be cleaned efficiently. When the series of operations has been completed the cleaned filter F is returned to the rack 3. After the predetermined time period necessary to dry, the cleaned filter F is brought out by a transporting unit such as a conveyor belt to the filtering unit to reinstall.

In this manner, the heavily contaminated filter F can be cleaned effectively, by subjecting to pretreatment before performing ultrasonic cleaning by the cleaning unit 6. Moreover, in this embodiment, the operation is efficiently performed in a short period of time by utilizing two separate conveyor units C1 and C2.

The cleaning operation for the less contaminated filter is performed by skipping the (steps g and h) as shown in FIG. 6. Also in this case, less contaminated filters F are classified in advance and arranged at the predetermined location on the rack 3. The filter F is taken out from the rack 3 by conveyor arms 14 of the conveyor unit C1 (step e), and then conveyed directly to the cleaning unit 6 by the conveyor unit C1 which moves along the rails 10 in the Y direction, and the conveyor cart 12 which moves along the conveyor frame 11 in the X direction.

Above the cleaning unit 6, the filter F is dipped into the cleaning liquid filled in the ultrasonic cleaning tank 6a by lowering conveyor arms 14 for performing ultrasonic cleaning (step i). After the predetermined time period, the filter F is removed from the cleaning unit 6 by conveyor arms 14 and returned to the predetermined location on the rack 3 (step j). A series of conveying operation is performed by the conveyor unit C1 as a single system.

As shown in FIG. 7, the cleaned filter F returned on the rack 3 is then taken out by conveyor arms 14 of the other conveyor unit C2 (step k). If rinsing is necessary (step 1), the remaining contaminant on the filter media f is rinsed away in the rinse tank 7 (step m). After rinsing in the rinse tank 7, the rinsed filter F is then conveyed to the adjacent restoration tank 8.

Above the restoration tank 8, the filter F is dipped into the restoration liquid filled in the restoration tank 8 by lowering conveyor arms 14. Leaving the filter F in the restoration fluid for the predetermined time period, the filter media f is restored (step n). If the sterilization is required (step o), the restored filter F is conveyed to the sterilization tank 9 to perform a sterilization process (step p). The sterilized filter F is removed from the sterilization tank 9 and conveyed by the conveyor unit C2 to the predetermined location on the rack 3.

In this manner, the less contaminated filter F can be cleaned efficiently in a short period of time because the filter media f can be subjected to ultrasonic cleaning by the cleaning unit 6 without pretreatment. The filters F having been cleaned by the series of steps are kept at a suitable place for a certain time period needed to dry, and are transported by the transporting unit (not shown) to the filtering unit for reinstall.

According to this embodiment, the degree of contamination is analyzed in advance and the filter F are arranged at a predetermined location on the rack 3 according to the degree of contamination.

Consequently, the flow of the cleaning operation can be simplified by operating conveyor unit C1 such that the cleaning operation of filters F arranged at certain locations on the rack 3 starts from the pretreatment tank 4, and the cleaning operation of filters F arranged at other locations on the rack 3 starts from the cleaning unit 6. In addition, according to this embodiment, the utilization of two conveyor units C1 and C2 greatly reduces the operational time required to perform the series of cleaning operations, because while the filter F to be cleaned is conveyed by one conveyor unit C1 into the cleaning unit 6 to perform the time consuming cleaning process, the cleaned filter F on the rack 3 is conveyed by other conveyor unit C2 into the rinse tank 7 to perform rinsing and subsequent process. As a result, the time required for the series of cleaning operations can be reduced greatly by the simultaneous operations of the two conveyor units C1 and C2.

The control panel 19 can be configured to monitor the temperature and quantity of the water in the cleaning unit 6 or to monitor contamination of the cleaning fluid according to the type of the filter F or the degree of its contamination.

In this embodiment, two conveyor units C1 and C2 are provided to efficiently clean filters, however, the conveying and holding operation of the entire cleaning process can be performed by a single conveyor unit when a small number of filters are cleaned. Thus the present invention is not intended to be limited to the embodiment described above.

Figure 8A:
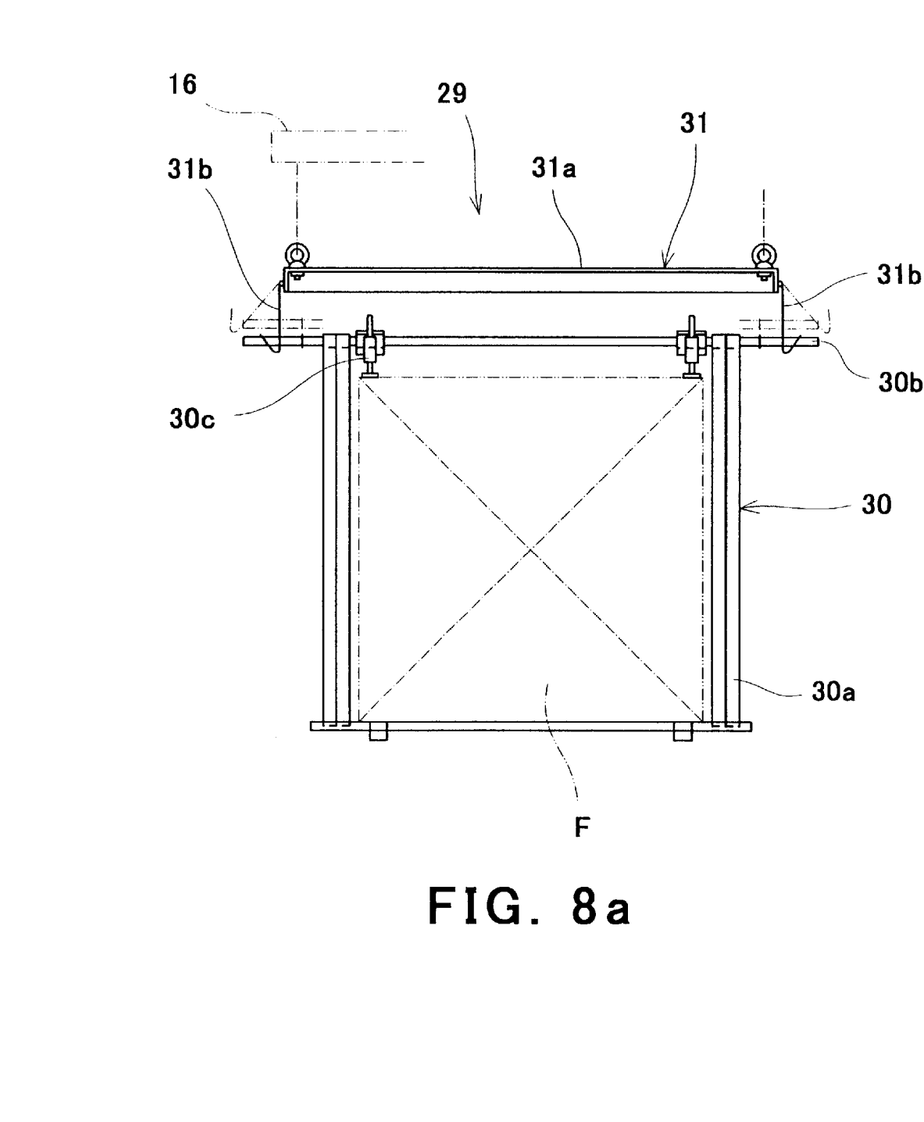
FIGS. 8a and 8b show a front view and a side view respectively of a second preferred embodiment of a holding means of the conveyor unit in the filter cleaning apparatus according to the present invention.
Figure 8B:
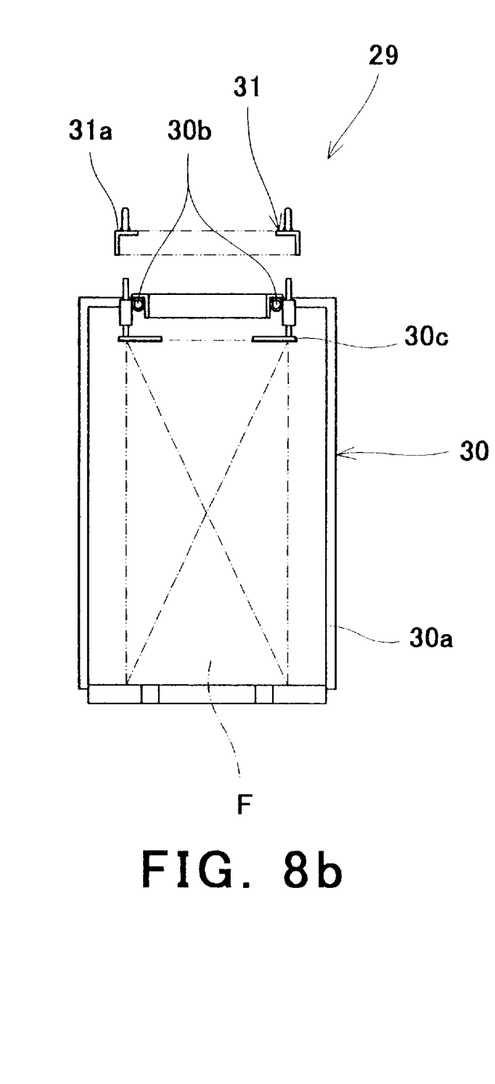
Figure 9A:
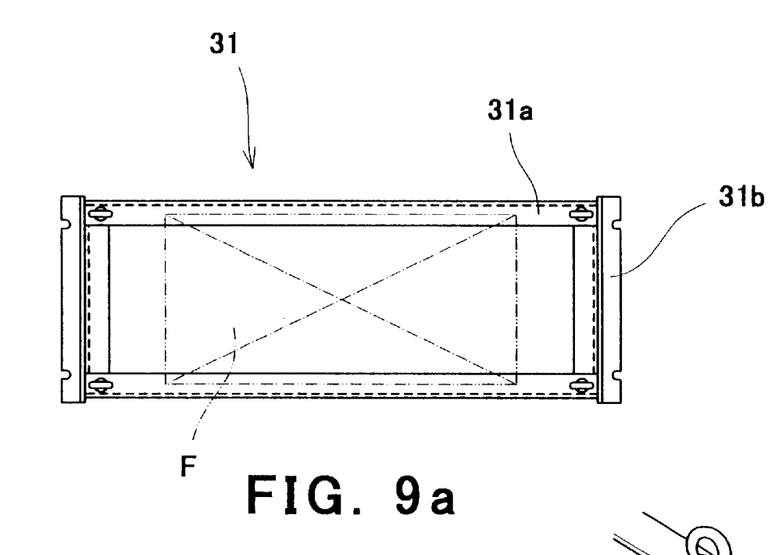
FIGS. 9a, 9b and 9c show a plan view, a side view and a perspective view, respectively, of the filter holding means in the conveyor unit in FIG. 8.
Figure 9B:
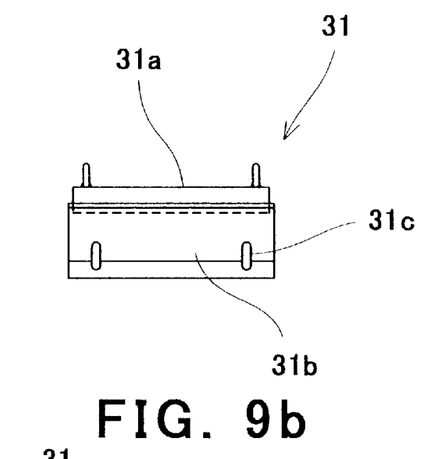
Figure 9C:
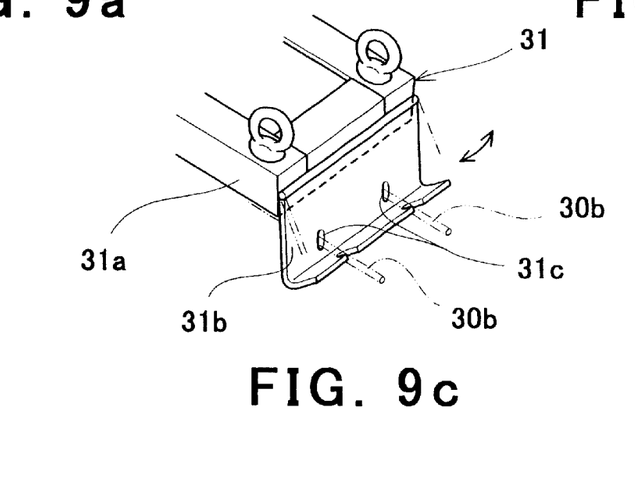

FIG. 8 shows a second embodiment of the conveyor unit in the filter cleaning apparatus according to the present invention FIG. 8a shows a front view and FIG. 8b shows a side view. FIG. 9 shows a filter retaining element of the conveyor unit shown in FIG. 8. FIG. 9a shows a plan view, FIG. 9b shows a side view and FIG. 9c shows a perspective view of the holding element. As shown in the figures, the filter F is retained to a filter retaining frame 29, and the retaining frame 29 is conveyed by the conveyor units C1 and C2 (FIG. 1).

As shown in FIG. 8a, the filter retaining frame 29 comprises a frame body 30 formed by frame members 30a which surround both sides and the bottom of the filter F, a rail member 30b which connects the upper portions of the frame members 30a, hold members 30c being movable along the rail member 30b; and suspension members 31 having latching members 31b which suspend the rail member 30b at both sides of the frame member 31a. The frame body 30 has a square shape in plan view as shown in FIG. 9a. The latching members 31b can swing outward, and are swung downward when the rail member 30 is suspended such that both ends of the rail member 30 are inserted into latching holes 31c (FIG. 9c) of the latching members 31b from left and right sides to support the rail member 30b, as shown in the two dotted chain lines in FIG. 8a.

With the filter retaining frame 29 of this configuration, the suspension member 31 is held by the platform 16 which is raised and lowered by the drive motor 15 in the same manner as the aforementioned conveyor units C1 and C2, so that the filter F is raised and lowered together with the frame body 30. Consequently, the filter F held by this filter retaining frame 29 can be processed without dipping the lower end portion of the conveyor unit such as conveyor arm 14 into the liquid in the tanks. Moreover, in this embodiment, the filter F is retained in suspended condition, the size of the tanks can be reduced widthwise making the whole unit more compact Adoption of this type of suspension means can be made in accordance with the type of filter F and the cleaning method, and the present invention is not intended to be limited to the preferred embodiment described above.

Numerous modifications and alternative embodiments of the present invention will be apparent to those skilled in the art in view of the foregoing description. Accordingly, this description is to be construed as illustratively only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A filter cleaning apparatus for cleaning contaminated filter including a filter media comprising:

means for analyzing a degree of contamination of the filter media;

means for arranging said filter at a predetermined location in the filter cleaning apparatus according to the degree of contamination;

means for conveying said filter from said predetermined location;

means for performing pretreatment of a filter media classified as heavily contaminated;

means for cleaning said filter media; and means for restoring the filter media for preventing reduction of thickness after the cleaning.

2. The apparatus according to claim 1, wherein said apparatus is provided with pretreatment rinsing means for rinsing the pretreated filters.

3. The apparatus according to claim 2, wherein said pretreatment rinsing means comprises a pretreatment rinse tank filled with rinsing liquid, and a flow generating means for directing rinsing liquid toward the filter media.

4. The apparatus according to claim 1, wherein said apparatus includes sterilizing means for sterilizing restored filter media.

5. The apparatus according to claim 1, wherein said conveying means are separately provided for conveying filters up to said cleaning means, and for conveying said cleaned filter.

6. A The apparatus according to claim 1, wherein said cleaning means is formed as an ultrasonic cleaning tank.

7. The apparatus according to claim 1, wherein said conveying means includes:

a frame for holding said filter and a holding means for holding said frame at an upper portion thereof while said filter is conveyed.

* * * * *

UNITED STATES PATENT AND TRADEMARK OFFICE
CERTIFICATE OF CORRECTION

PATENT NO.   : 6,394,113 B1
DATED        : May 28, 2002
INVENTOR(S)  : Shingo Hatanaka et al.

It is certified that error appears in the above-identified patent and that said Letters Patent is hereby corrected as shown below:

<u>Column 10,</u>
Line 44, delete "A" in the first line.

Signed and Sealed this

Eighteenth Day of February, 2003

JAMES E. ROGAN
*Director of the United States Patent and Trademark Office*